United States Patent [19]

Leussler

[11] Patent Number: 4,702,751
[45] Date of Patent: Oct. 27, 1987

[54] GRANULAR FILTER AND METHOD OF OPERATING SAME

[75] Inventor: Wilhelm Leussler, Frankfurt am Main, Fed. Rep. of Germany

[73] Assignee: Metallgesellschaft Aktiengesellschaft, Frankfurt am Main, Fed. Rep. of Germany

[21] Appl. No.: 932,190

[22] Filed: Nov. 18, 1986

[30] Foreign Application Priority Data

Nov. 21, 1985 [DE] Fed. Rep. of Germany ....... 3541174

[51] Int. Cl.⁴ ............................................. B01D 46/04
[52] U.S. Cl. ........................................... 55/96; 55/98; 55/291; 55/302; 55/474; 210/276
[58] Field of Search ................... 55/96, 98, 99, 291, 55/302, 387, 474; 210/276, 280

[56] References Cited

U.S. PATENT DOCUMENTS 3,564,570  2/1971  Lincoln et al. ................... 55/291

FOREIGN PATENT DOCUMENTS 1084051  4/1984  U.S.S.R. ........................... 55/387

Primary Examiner—Bernard Nozick
Attorney, Agent, or Firm—Karl F. Ross; Herbert Dubno

[57] ABSTRACT

A horizontal-flow granular filter is provided at its bottom part with openings through which pistons are displaceable in an up-and-down movement to loosen the granular bed during back-flushing of the filter. This reduces the energy cost of cleaning and the tendency toward abrasive deterioration of the granule while also ensuring an improved cleaning action.

20 Claims, 6 Drawing Figures

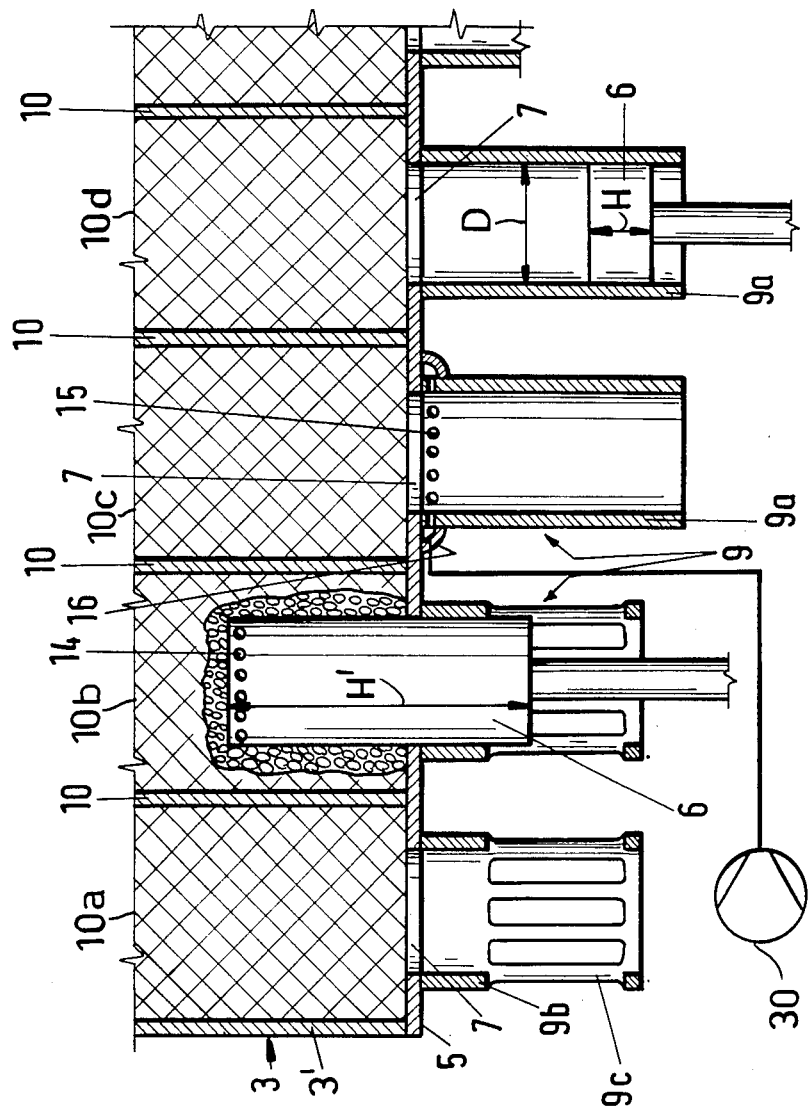

GRANULAR FILTER AND METHOD OF OPERATING SAME

FIELD OF THE INVENTION

My present invention relates to a granular filter and to a method of operating same, more particularly, to a granular filter which is traversed horizontally in one direction by a fluid to be filtered and can also be traversed in the opposite direction by a back-flushing fluid.

BACKGROUND OF THE INVENTION

A granular filter for a horizontal gas flow can comprise two spaced apart, vertical, gas-permeable walls, a frame to which these walls are affixed at opposite sides and which has a pair of vertical side walls and a bottom wall or part. The frame can also be closed at its top and defines with the fluid-permeable walls a chamber containing a granular bed. It is customary in many cases to clean the granular material of the bed outside of the filter in a separate cleaning chamber.

Batches of the granular material may be cleaned at intervals or the granular material may be continuously circulated from the bed to the cleaning chamber.

In such cleaning processes expensive means may be required for displacing the granular material to be cleaned, considerable energy is consumed in the displacement of the material, and the system is prone to breakdown because the conveying means is generally operated for brief periods in batch handling, and frequent switching on and off of the conveying means results in premature breakdown and high servicing cost.

The continuous circulation system also has problems because the parts involved are subjected to considerable wear and the continuous circulation can result in rapid abrasive deterioration of the granular material, thereby altering the characteristics of the filter and particularly the flow resistance to the fluid to be filtered which can be greatly increased.

It has, therefore, been proposed to clean the granular material in the filter itself by interrupting the flow of gas and providing a backflow of gas or other fluid, hereinafter referred to as the back-flushing fluid.

In this operation, however, not all of the substances which have been collected from the gas which was filtered, can be completely removed. It is known to improve the back-flushing by wrapping the granular bed, but such wrapping or vibration tends to cause excessive settling and abrasion, thereby increasing the density of the bed and the resistance to flow of the filter.

OBJECTS OF THE INVENTION

It is, therefore, the principal object of the present invention to provide a horizontal-flow granular filter whereby these drawbacks are avoided.

Another object of this invention is to provide an improved method of operating such a filter in which abrasive deterioration of the filter material is reduced but nevertheless practically complete removal of trapped impurities can be ensured.

Another object of the invention is to provide a filter in which abrasion of the granules during cleaning of the granular bed by a back-flowing fluid is minimized, the energy required for cleaning is comparatively low and the cleaning operation does not alter the filter characteristics or materially increase the resistance to flow for subsequent filtering.

SUMMARY OF THE INVENTION

These objects and others which will become apparent hereinafter are attained, in accordance with the invention by providing the bottom part or wall of the frame or housing of the granular filter described above with at least one opening through which a piston can pass and which is sealed against outflow of granules by this piston which is moved up and down prior to or during back-flushing to loosen the bed.

During cleaning by the backflow fluid, therefore, the granular bed is loosened by the movement of the piston so that the cleaning is performed in an improved manner compared to the cleaning of a static bed by back-flushing. The stroke and velocity of the area of each piston can be selected to suit the requirements in each case so that optimum energy economy, good cleaning action and low abrasion of granules can result.

According to a feature of this invention, the bottom wall is provided with a plurality of such openings and a respective piston is displaceable in each of the openings, the openings in the bottom wall having a total area corresponding to 30 to 70% of the total area of the bottom of the bed. Advantageously, the openings are circular and have a diameter of 60 to 80% of the depth of the bed, i.e. the horizontal dimension of the bed in the flow direction of the fluid therethrough from one of the permeable walls to the other permeable wall.

I have found that it is advantageous to provide for each piston, extending downwardly from the bottom wall of the filter, a piston-guide cylinder which can, if desired, be formed with an openwork extension. In the latter case the cylinder is comparatively short. When a relatively long piston-guide cylinder is provided, however, each of the pistons can have a skirt height of 0.4 D to 0.5 D, where D is the piston diameter. The pistons are mounted and the means for displacing same is so arranged that the pistons have upper deadcenter positions, for long guide cylinders, in which the pistons protrude by 0.2 D to 0.3 D into the bed above the upper surface of the bottom wall. In this case they may have lower dead-center positions in which the upper ends lie 1.2 D to 2 D below the upper surface of the bottom wall.

In the case in which the openwork extension is provided on relatively short piston-guide cylinders, the pistons preferably each have a skirt height of 2.5 D to 3 D, upper dead-center positions in which they protrude 2 D to 2.5 D into the bed above the upper surface of the bottom wall, and lower deadcenter positions in which the upper ends of the piston lie 0.2 to 0.3 D below the upper surface of the bottom wall.

I can use a crank mechanism to displace the pistons or a fluid-operated drive, e.g. hydraulic or pneumatic.

It has been found to be advantageous, moreover, to subdivide the compartments by vertical partitions which are parallel to the sidewalls and extend between the fluid-permeable walls, each compartment being provided with at least one and advantageously between 2 and 4 such pistons. The duct means communicating with the filter should also have passages which are subdivided to correspond to the subdivision of the chamber into the compartments to ensure a uniform flow through all compartments.

Either the pistons or the guide cylinders or both can be provided with bores through which cleaning air can be fed to flush the space between the pistons and the compartments.

In its method aspects, the invention comprises a method of cleaning the filter in which the pistons are moved up and down during or prior to the back-flushing and, of course, a method of operating the granular filter utilizing this principle.

The method of operating the granular filter thus comprises providing the granular bed in a filter chamber defined by the bottom wall, a pair of sidewalls and fluid-permeable end walls, filtering materials from a fluid carrying these materials by horizontal passage of this fluid through the granular bed in one direction and then terminating this flow.

Upon termination of the filter flow, a back-flushing fluid can be passed in the opposite direction through the bed and at least upon the passage of the back-flushing fluid through the bed, i.e. prior to such back-flushing or concurrently therewith, a plurality of pistons are given an up-and-down movement to project into the bed and loosen the latter.

The back-flushing fluid can be passed through the bed at time-spaced intervals and the bed can be loosened for a period of time at such intervals. The pistons can be simultaneously moved up and down 2 or 3 times during each such period.

Alternatively, the pistons can be individually moved up and down at successive intervals of time and, according to another feature of the invention, the bed can be provided in compartments which are successively cleaned with the loosening of the bed by the up-and-down movement of the piston.

BRIEF DESCRIPTION OF THE DRAWING

The above and other objects, features and advantages of the present invention will become more readily apparent from the following description, reference being made to the accompanying drawing in which:

FIG. 2 is a vertical cross sectional view through the lower part of the filter showing various piston and guide cylinder or sleeve arrangements;

SPECIFIC DESCRIPTION

Figure 1:
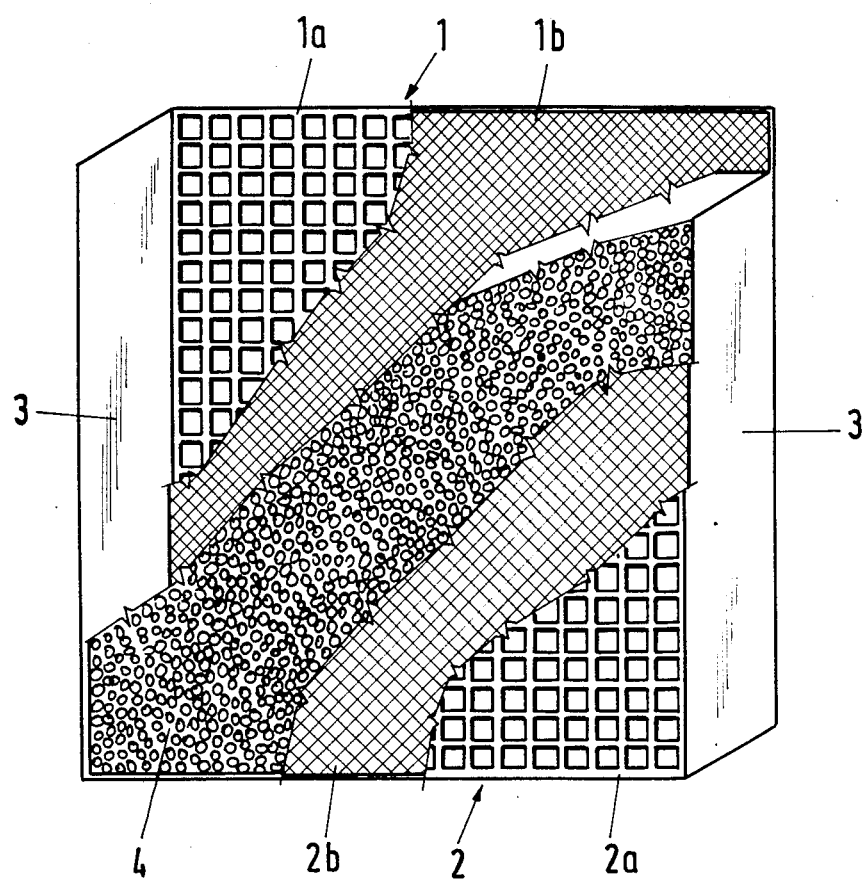
FIG. 1 is a perspective view illustrating the basic arrangement of a granular filter according to the invention.

The granular filter shown in FIG. 1 is designed for horizontal flow of gas in the filtering thereof and has two gas-permeable vertical walls 1 and 2 which are spaced apart and comprise respectively a perforated plate 1a and 2a and a wire screen 1b, 2b dimensioned to retain the granules.

The gas-permeable walls 1 and 2 close the sides of a space or chamber also defined by an open-topped frame 3 and containing the granular bed 4.

In FIG. 1 the wall portions and granular bed have been shown in part and various parts have been broken away to expose underlying parts.

In the flow direction, the perforated plate 2a, the wire screen 2b, the granular bed 4, the wire screen 1b and the perforated plate 1a are opened in order.

It can be seen from FIG. 2 that openings are provided in the bottom part or wall 5 of the frame 3 which has sidewalls 3' rising from the bottom wall 5. The circular openings 7 are sealed against outflow of granules by pistons 6 which can be moved up and down in and out of the openings.

The filter chamber is subdivided by partitions 10 into respective compartments 10a, 10b, 10c, 10d . . . which are associated with respective openings 7 and pistons 6.

For clarity the pistons are shown only for those openings which are associated with the second and fourth chambers 10b, 10d from the left, it being understood that corresponding pistons will be provided for the other openings as well.

Each of the openings 7 is provided with a piston-guide cylinder or sleeve 9, shown to be constituted by relatively long cylinders 9a or short cylinders 9b which have web extensions 9c, the cylinders projecting downwardly from the bottom wall 5.

Where the long cylinders are used, the pistons can have a skirt height H of 0.4 to 0.5 D where D is the piston diameter. Where the short cylinders and sleeves are used, the skirt height H' can be 2.5 to 3 D.

Either the piston 6 or the piston guides 9 or both can be provided with bores 14, 15 connected with a source of cleaning air shown to be a compressor 30. The cleaning air can thus be blown into any space between the piston 6 and the piston guide 9. An annular conduit or manifold 16 serves to supply the air to the bores 15.

While it has been shown in FIG. 2 that the pistons and piston guides of compartments 10a and 109b differ from those of compartments 10c and 10d, to avoid an unnecessarily large number of drawing Figures, it will be understood that for any given filter all of the chambers and pistons thereof will be of the same configuration.

Figure 3:
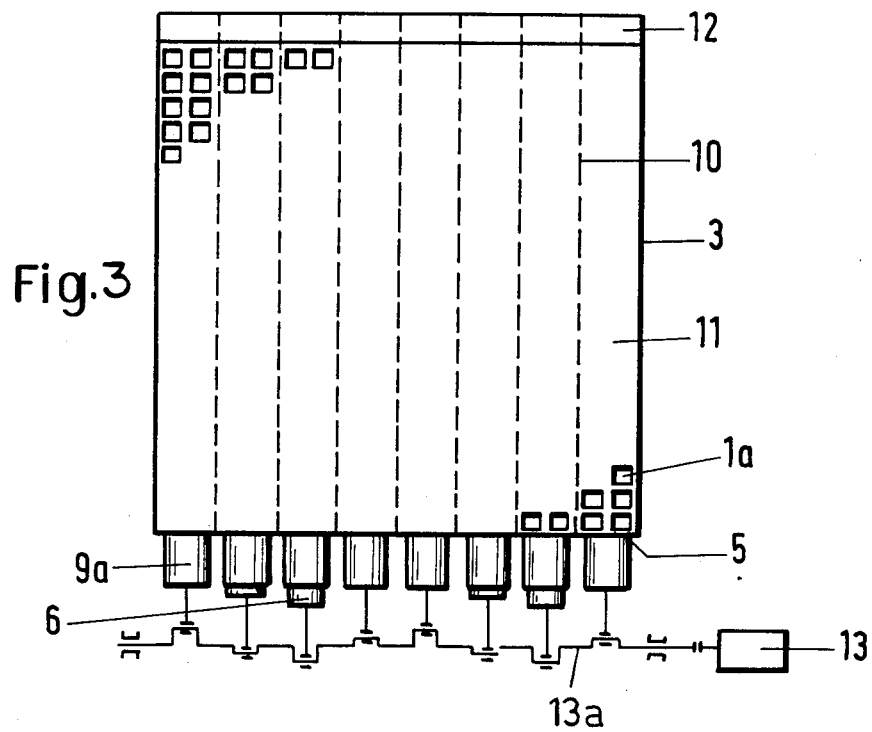
FIG. 3 is an elevational view in simplified form illustrating the invention.
Figure 4:
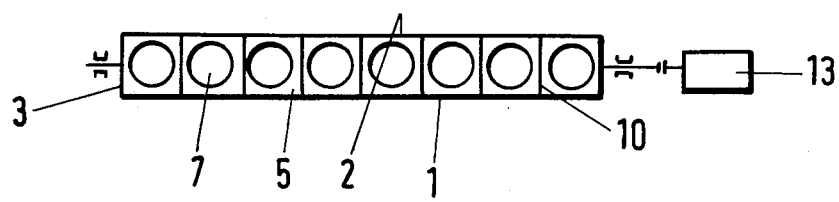
FIG. 4 is a top view of the bottom wall of this filter also in diagrammatic form.

FIGS. 3 and 4 show in a simplified form that a crankshaft 13a driven by a motor 13 can be used to drive the pistons 6.

The top of the filter can be provided with a cover 12 to prevent flow through an uppermost portion of the granular bed so that gas cannot flow through areas of the filter which contain no granules and which can be traversed by the gas without cleaning the latter. The top of the filter may be similarly closed. With the crankshaft arrangement of FIGS. 3 and 4, the granular bed in all chambers will be loosened at the same time and in this case the entire granular filter can be back-flushed.

Figure 5:
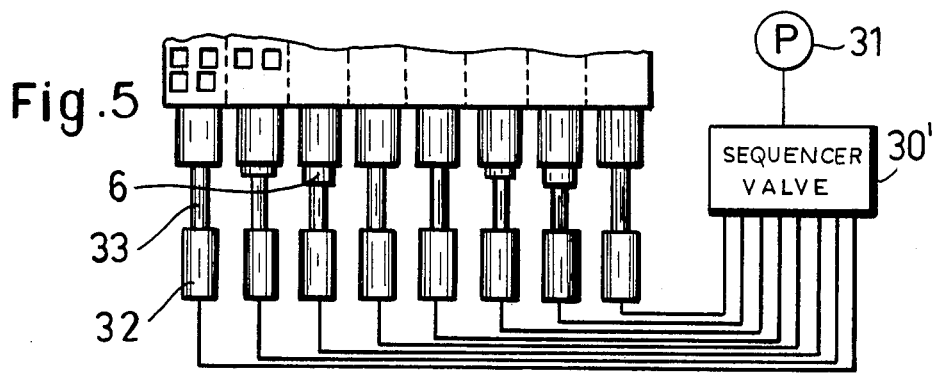
FIG. 5 is a fragmentary view otherwise similar to FIG. 3 illustrating another arrangement for operating the piston.

In FIG. 5, however, I show an arrangement in which a sequencing valve 30 connects a source 31 of hydraulic or pneumatic pressure to piston-actuating cylinders 32 connected to the piston 6 by rods 33 so that the chambers can be cleaned in succession or in any desired sequence. This, of course, allows certain compartments to be closed off to the filter flow and open to the back-flush flow during this selective cleaning operation while the remainder of the filter remains in filter operation. This permits additional adaptation of the invention to conditions of a given case in addition to allowing free selection of the piston stroke and velocity within a substantial range.

Figure 6:
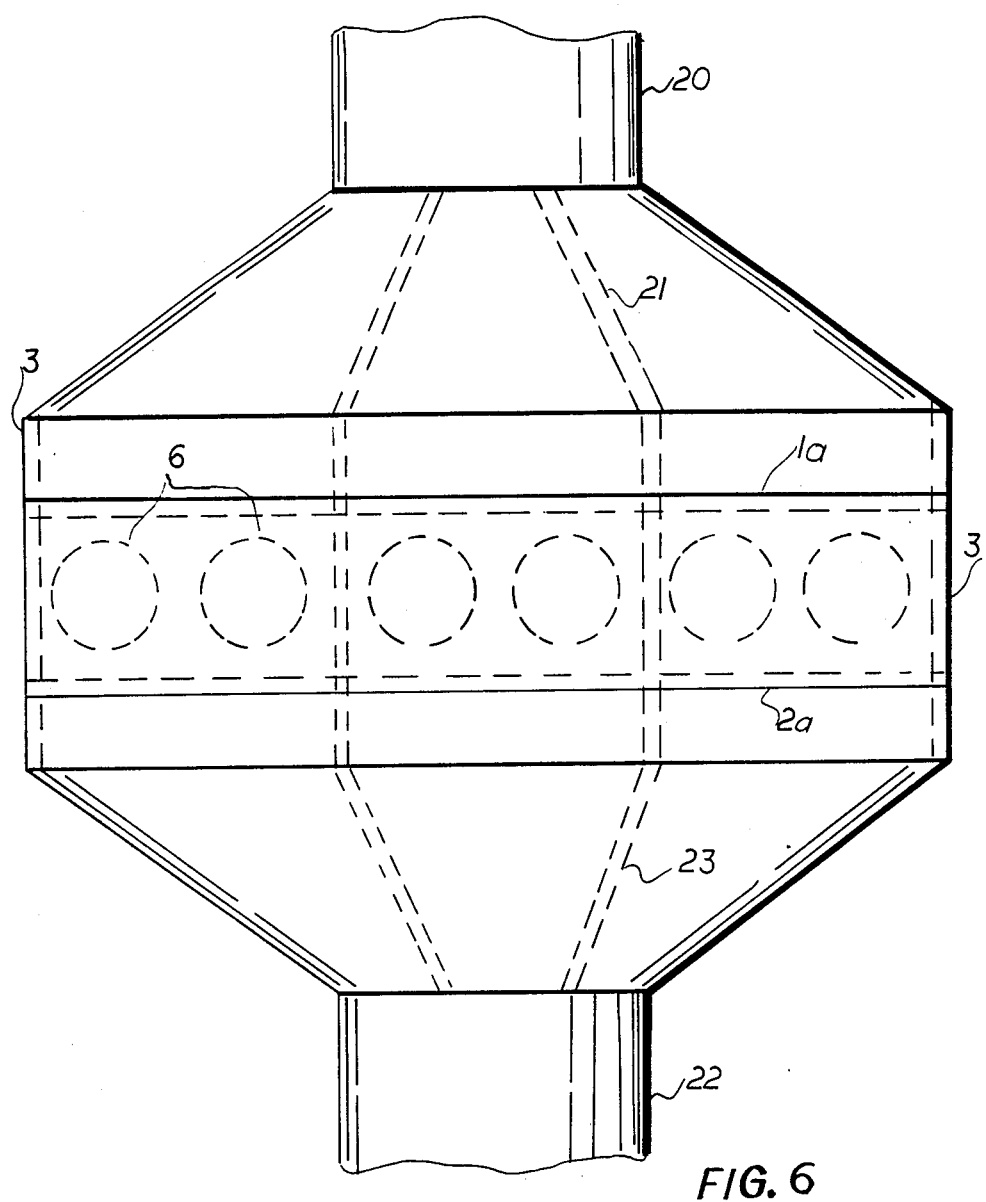
FIG. 6 is a plan view of a filter according to the invention.

As can can seen from FIG. 6, the filter is received between an inlet duct 22 and an outlet duct 20, the ducts 22 and 20 being provided with internal partitions 21 and 23 corresponding to the partitions 10 to subdivide the flow through the filter either for back-flushing or for filtering uniformly to the compartments.

The individual compartments 11, moreover, are here each shown to have two pistons associated therewith which can be simultaneously or in a staggered arrangement given an up-and-down movement.

I claim:

1. A method of operating a granular filter which comprises the steps of:
   providing a granular bed in a filter chamber defined by a bottom wall, a pair of sidewalls and a pair of vertical fluid-permeable walls closing opposite ends of said chamber
   passing a fluid to be filtered through said bed in one horizontal direction, said fluid traversing said fluid-permeable walls;
   at time-spaced intervals terminating the flow of the fluid to be filtered and passing a back-flushing fluid through said bed to remove material trapped by said bed; and
   at least upon the passage of said back-flushing fluid through said bed, loosening the granular bed by imparting an up-and-down movement to at least one piston adapted to project through said bottom wall into said bed.

2. The method defined in claim 1 wherein said granular bed in loosened prior to passage of said back-flushing fluid through said bed.

3. The method defined in claim 1 wherein said granular bed in loosened during passage of said back-flushing fluid through said bed.

4. The method defined in claim 1 wherein said back-flushing fluid is passed through said bed at time-spaced intervals and said bed in loosened for a period during each said interval, a plurality of said pistons being provided and all of said pistons are simultaneously moved up and down two to three times during each such period.

5. The method defined in claim 1 wherein a plurality of said pistons are provided and said pistons are individually moved up and down in successive intervals of time.

6. The method defined in claim 1 wherein said chamber is subdivided into vertical compartments each having at least one of said pistons, the portions of said bed in said compartments being cleaned in succession at respective intervals of time.

7. A granular filter, comprising:
   a frame having a bottom wall and a pair of sidewalls;
   a pair of fluid-permeable end walls closing opposite sides of said frame and forming a chamber therewith containing a granular filter bed;
   at least one opening formed in said bottom wall;
   a respective piston vertically displaceable in said opening into said bed and preventing escape of granules of said bed therethrough; and
   means for displacing said piston up and down to loosen said bed including means for back-flushing thereof.

8. The granular filter defined in claim 1 wherein said bottom wall is provided with a plurality of said openings, a respective said piston being displaceable in each of said openings, said openings in said bottom wall having a total area corresponding to 30% to 70% of the total area of the bottom of said bed.

9. The granular filter defined in claim 8 wherein said openings are circular.

10. The granular filter defined in claim 9 wherein said means for displacing is a crank mechanism operatively connected to all of said pistons.

11. The granular filter defined in claim 9 wherein said means for displacing is a fluid-operated drive operatively connected to all of said pistons.

12. The granular filter defined in claim 9 wherein said openings have a diameter of 60% to 80% of the depth of said bed measured in a flow direction of fluid therethrough from one of said fluid-permeable walls to the other of said fluid-permeable walls.

13. The granular filter defined in claim 9, further comprising a respective piston guide cylinder surrounding each opening and extending downwardly from said bottom wall.

14. The granular filter defined in claim 13 wherein said pistons are provided with bores for blowing cleaning air into a space between each piston and the respective piston guide cylinder.

15. The granular filter defined in claim 13 wherein said piston guide cylinders are provided with bores for blowing cleaning air into a space between each piston and the respective piston guide cylinder.

16. The granular filter defined in claim 13 wherein said pistons each have a skirt height of 0.4 D to 0.5 D, where D is the piston diameter, said means for displacing imparting a stroke to each of said pistons such that the pistons have upper dead center positions in which they protrude by 0.2 D to 0.3 D into the bed from the upper surface of said bottom wall and have lower dead center positions in which they lie 1.2 D to 2 D below said upper surface of said bottom wall.

17. The granular filter defined in claim 13, further comprising a respective laterally open web-structure extension downwardly extending from each of said piston guide cylinders.

18. The granular filter defined in claim 17 wherein said pistons each have a skirt height of 2.5 D to 3 D, where D is the piston diameter, said means for displacing imparting a stroke to each of said pistons such that the pistons have upper dead center positions in which they protrude by 2 D to 2.5 D into the bed from the upper surface of said bottom wall and have lower dead center positions in which they lie 0.2 D to 0.3 D below said upper surface of said bottom wall.

19. The granular filter defined in claim 9, further comprising spaced apart vertical partitions extending between said fluid-permeable walls parallel to said sidewalls and subdividing said chamber into respective compartments, each containing a portion of said bed, said filter comprising means forming passages communicating with said compartments through said fluid-permeable walls and subdivided correspondingly to said compartments for feeding fluid into and withdrawing fluid from said compartments.

20. The granular filter defined in claim 11 wherein each of said compartments is provided with at least two and at most four said pistons.

* * * * *